United States Patent
Miyazaki et al.

(10) Patent No.: US 10,033,893 B2
(45) Date of Patent: Jul. 24, 2018

(54) IMAGE READING APPARATUS AND NON-TRANSITORY STORAGE MEDIUM STORING INSTRUCTIONS TO BE EXECUTED BY THE IMAGE READING APPARATUS

(71) Applicant: BROTHER KOGYO KABUSHIKI KAISHA, Nagoya-shi, Aichi-ken (JP)

(72) Inventors: Sadaaki Miyazaki, Nagoya (JP); Wataru Mizumukai, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 91 days.

(21) Appl. No.: 15/007,387

(22) Filed: Jan. 27, 2016

(65) Prior Publication Data

US 2016/0227062 A1    Aug. 4, 2016

(30) Foreign Application Priority Data

Jan. 30, 2015   (JP) .................................. 2015-017155

(51) Int. Cl.
   *G06F 15/00*        (2006.01)
   *H04N 1/00*         (2006.01)

(52) U.S. Cl.
   CPC ..... *H04N 1/00663* (2013.01); *H04N 1/00477* (2013.01)

(58) Field of Classification Search
   CPC ................... H04N 1/00663; H04N 1/00477
   USPC ........................................................ 358/498
   See application file for complete search history.

(56) References Cited

U.S. PATENT DOCUMENTS

| | | | |
|---|---|---|---|
| 2003/0137701 A1* | 7/2003 | Shimizu ............. | H04N 1/32101 358/474 |
| 2009/0244650 A1* | 10/2009 | Matsuo ................ | G03G 15/602 358/474 |
| 2010/0245879 A1* | 9/2010 | Tsuya ................. | H04N 1/32128 358/1.13 |

FOREIGN PATENT DOCUMENTS

JP          H09-205506 A     8/1997

* cited by examiner

*Primary Examiner* — Mark R Milia
(74) *Attorney, Agent, or Firm* — Scully, Scott, Murphy & Presser, P.C.

(57) ABSTRACT

In an image reading apparatus, a display displays a first screen on within at least a portion of a first reading processing, and its period extends from a time point at which a conveying mechanism starts conveying the first one of at least one document placed on a document supporter, to a time point at which the conveying mechanism finishes conveying the last one of the at least one document. The first screen inquires about whether a continuous reading processing is to be executed after the first reading processing. A controller determines whether a signal indicating execution of the continuous reading processing is received, with the first screen being displayed. The display displays a second screen when the signal indicating execution of the continuous reading processing is received. The second screen accepts an instruction of execution of the continuous reading processing.

15 Claims, 10 Drawing Sheets

IMAGE READING APPARATUS AND NON-TRANSITORY STORAGE MEDIUM STORING INSTRUCTIONS TO BE EXECUTED BY THE IMAGE READING APPARATUS

CROSS REFERENCE TO RELATED APPLICATION

The present application claims priority from Japanese Patent Application No. 2015-017155, which was filed on Jan. 30, 2015, the disclosure of which is herein incorporated by reference in its entirety.

BACKGROUND

Technical Field

The following disclosure relates to an image reading apparatus configured to read a document placed on a document supporter and to a non-transitory storage medium storing a plurality of instructions to be executed by a processor of an image reading apparatus.

Description of the Related Art

There is known an image reading apparatus for reading documents placed on a document supporter. In such an image reading apparatus, a plurality of documents placed on the document supporter are conveyed one by one by an automatic document feeder (ADF), and a scan processing is executed for the documents. However, the document supporter can support only up to a predetermined number of documents. Thus, in the case where the scan processing is executed for documents of greater than the predetermined number, a continuous scanning is executed as follows. The documents of less than or equal to the predetermined number are first placed on the document supporter, and the scan processing is executed therefor. After completion of this scanning, the rest is placed on the document supporter, and the scan processing is executed therefor. Scan data obtained by the two or more scanning processings is treated as a series of data, i.e., data obtained by a single scan processing. The image reading apparatus capable of executing the continuous scan processing inquires, before execution of the scan processing, about whether the continuous scan processing is to be executed.

SUMMARY

However, in the case where the image reading apparatus inquires about whether the continuous scan processing is to be executed, before execution of the scan processing, a user needs to perform an input to respond to the inquiry, not enabling quick execution of the scan processing, resulting in low operability. Even if the image reading apparatus is configured to inquire about whether an additional scan processing is to be executed, after execution of the scan processing, the user likewise needs to perform an input to respond to the inquiry, not enabling quick execution of the scan processing. Accordingly, an aspect of the disclosure relates to improvement of operability of an image reading apparatus.

In one aspect of the disclosure, an image reading apparatus includes: a document supporter configured to support at least one document; an output-document receiving member; a conveying mechanism configured to convey the at least one document one by one from the document supporter along a conveyance path; a reading device provided on the conveyance path and configured to execute a reading processing in which the reading device reads the at least one document conveyed by the conveying mechanism; an output device configured to output reading data created based on the at least one document read by the reading device; a display; a user interface configured to receive a signal based on a user operation; and a controller. The controller is configured to perform: displaying a first screen on the display during at least a portion of a first reading processing, a period of the first reading processing extending from a time point at which the conveying mechanism starts conveying a first one of the at least one document placed on the document supporter, to a time point at which the conveying mechanism finishes conveying a last one of the at least one document placed on the document supporter, the first screen being configured to inquire about whether a continuous reading processing is to be executed after a completion of the first reading processing; determining, in a first determination processing, whether a signal indicating execution of the continuous reading processing is received by the user interface in a state in which the first screen is displayed; displaying a second screen when the controller determines in the first determination processing that the signal indicating execution of the continuous reading processing is received by the user interface, the second screen being configured to accept an instruction of execution of the continuous reading processing that is to be executed after the completion of the first reading processing; and combining reading data created in the first reading processing and reading data created in the continuous reading processing with each other as a group of reading data and controlling the output device to output the group of reading data when the controller determines that the instruction of execution of the continuous reading processing is accepted on the second screen.

In one aspect of the disclosure, a non-transitory storage medium stores a plurality of instructions to be executed by a processor of an image reading apparatus. The image reading apparatus includes: a document supporter configured to support at least one document; an output-document receiving member; a conveying mechanism configured to convey the at least one document one by one from the document supporter along a conveyance path; a reading device provided on the conveyance path and configured to execute a reading processing in which the reading device reads the at least one document conveyed by the conveying mechanism; an output device configured to output reading data created based on the at least one document read by the reading device; a display; and a user interface configured to receive a signal based on a user operation. The plurality of instructions, when executed by the processor, cause the image reading apparatus to perform: displaying a first screen on the display during at least a portion of a first reading processing, a period of the first reading processing extending from a time point at which the conveying mechanism starts conveying a first one of the at least one document placed on the document supporter, to a time point at which the conveying mechanism finishes conveying a last one of the at least one document placed on the document supporter, the first screen being configured to inquire about whether a continuous reading processing is to be executed after a completion of the first reading processing; determining, in a first determination processing, whether a signal indicating execution of the continuous reading processing is received by the user interface in a state in which the first screen is displayed; displaying a second screen when the controller determines in the first determination processing that the signal indicating execution of the continuous reading processing is received by the user interface, the second screen being configured to accept an instruction of execution of the continuous reading processing that is to be executed after the completion of the first reading processing; and combining reading data created in the first reading processing and reading data created in the continuous reading processing with each other as a group of reading data and controlling the output device to output the group of reading data when the controller determines that the instruction of execution of the continuous reading processing is accepted on the second screen.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Figure 1:
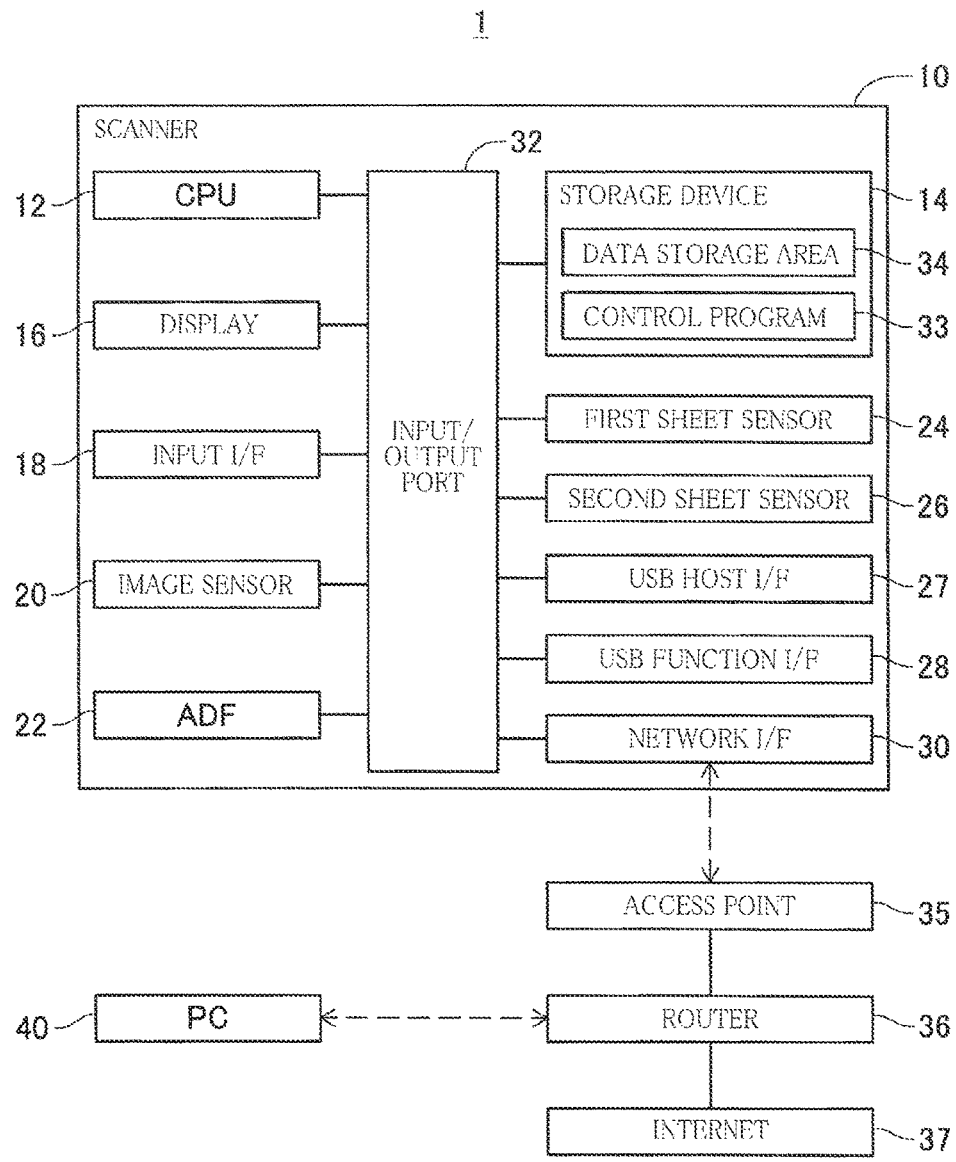
FIG. 1 is a block diagram illustrating a scanner according to embodiments.

Hereinafter, there will be described embodiments by reference to the drawings. As illustrated in FIG. 1, a communication system 1 includes a scanner 10 according to a first embodiment, and a personal computer (PC) 40. The scanner 10 is one example of an image reading apparatus. The scanner 10 includes a central processing unit (CPU) 12 as one example of a controller and a computer, a storage device 14, a display 16, an input interface 18 as one example of a user interface, an image sensor 20 as one example of a reading device, an automatic document feeder (ADF) 22 as one example of a conveying mechanism, a first sheet sensor 24, a second sheet sensor 26, a USB host interface 27, a USB function interface 28, and a network interface 30. These devices are communicable with each other via an input/output port 32.

The CPU 12 executes processings according to a control program 33 stored in the storage device 14. The control program 33 is a program for execution of a scan processing. Hereinafter, the CPU 12 that executes programs such as the control program 33 may be simply referred to as the name of the program. For example, the wording "the control program 33 executes" may mean "the CPU 12 that executes the control program 33 executes".

The storage device 14 has a data storage area 34. The data storage area 34 is an area for storing data required for the CPU 12 to execute the control program 33. The storage device 14 is constituted by a combination of a random access memory (RAM), a read only memory (ROM), a flash memory, a hard disk (HDD), and a buffer of the CPU 12.

The display 16 has a display surface for displaying various kinds of functions of the scanner 10. Examples of the display 16 include an LCD, an organic EL display, and a plasma display. One example of the input interface 18 is a touchscreen integrally superposed on the display 16. The input interface 18 accepts user operations performed on buttons displayed on the display 16. Other examples of the input interface 18 include hard keys.

The image sensor 20 reads an image. Examples of the image sensor 20 include a CCD image sensor and a contact image sensor. A plurality of documents can be placed on a sheet-supply tray 50 (see FIG. 2) as one example of a document supporter. The ADF 22 is a mechanism for conveying documents one by one from the sheet-supply tray 50 to an output tray 60 (see FIG. 2) via a position at which the image sensor 20 reads the document. The output tray 60 is one example of an output-document receiving member. The first sheet sensor 24 detects whether the document is supported on the sheet-supply tray 50. The second sheet sensor 26 detects the document conveyed by the ADF 22 in the scanner 10.

Each of the USB host interface 27 and the USB function interface 28 is a USB interface. A USB memory can be mounted on and removed from the USB host interface 27. A user can mount a USB memory on the USB host interface 27 to cause printing based on image data stored in the USB memory and to store image data obtained by reading of the scanner 10, into the USB memory. It is noted that any storage media having a USB interface can be used in the scanner 10. The USB function interface 28 is an interface for data communication with an external device, e.g., a host computer, via a USB cable.

The network interface 30 is connected to a router 36 via an access point 35. The router 36 is connected to the Internet 37 and the PC 40. As a result, the scanner 10 can transfer various kinds of data with the PC 40 or with other devices over the Internet 37.

Figure 2:
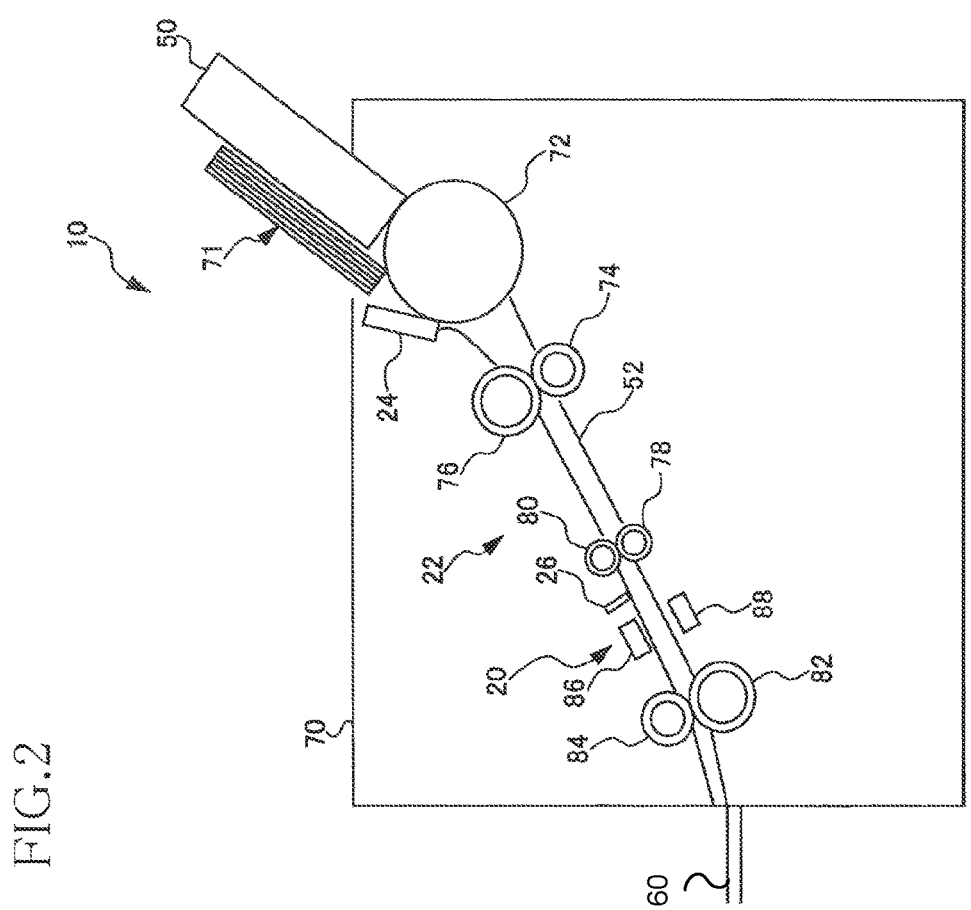
FIG. 2 is a view illustrating an internal structure of the scanner.

As illustrated in FIG. 2, the scanner 10 includes the sheet-supply tray 50, a conveyance path 52, the output tray 60, the image sensor 20, the ADF 22, the first sheet sensor 24, and the second sheet sensor 26.

The sheet-supply tray 50 is disposed at an upper rear portion of an apparatus body 70 of the scanner 10. One or more documents 71 can be set on this sheet-supply tray 50. The output tray 60 is disposed on a front side of the apparatus body 70. The documents 71 for which the scan processing is finished are discharged onto the output tray 60. The conveyance path 52 is formed in the apparatus body 70 so as to connect the sheet-supply tray 50 and the output tray 60 to each other.

The ADF 22 is a mechanism for conveying the documents 71 one by one from the sheet-supply tray 50 to the output tray 60 via the conveyance path 52. The ADF 22 includes a first conveying roller 72, a second conveying roller 74, a driven roller 76, a third conveying roller 78, a driven roller 80, a fourth conveying roller 82, and a driven roller 84.

The first conveying roller 72 is provided on a most-upstream portion of the conveyance path 52, i.e., near the sheet-supply tray 50. The first conveying roller 72 separates and supplies the documents one by one from the sheet-supply tray 50 into the conveyance path 52. The second conveying roller 74 is provided downstream of the first conveying roller 72 on the conveyance path 52. The driven roller 76 is provided so as to be held in pressing contact with the second conveying roller 74. The document supplied into the conveyance path 52 by the first conveying roller 72 is conveyed toward a downstream side, with the document nipped between the second conveying roller 74 and the driven roller 76. The third conveying roller 78 is provided downstream of the second conveying roller 74 on the conveyance path 52. The driven roller 80 is provided so as to be held in pressing contact with the third conveying roller 78. The document supplied by the second conveying roller 74 and the driven roller 76 is conveyed toward a downstream side, with the document nipped between the third conveying roller 78 and the driven roller 80. The fourth conveying roller 82 is provided downstream of the third conveying roller 78 on the conveyance path 52. The driven roller 84 is provided so as to be held in pressing contact with the fourth conveying roller 82. The document supplied by the third conveying roller 78 and the driven roller 80 is conveyed toward a downstream side and discharged onto the output tray 60, with the document nipped between the fourth conveying roller 82 and the driven roller 84.

The image sensor 20 is constituted by an upper line sensor 86 and a lower line sensor 88. The upper line sensor 86 is provided between the driven roller 80 and the driven roller 84 and on an upper side of the conveyance path 52. The upper line sensor 86 reads an image on an upper surface of the document conveyed along the conveyance path 52. The lower line sensor 88 is provided between the third conveying roller 78 and the fourth conveying roller 82 and on an opposite side of the conveyance path 52 from the upper line sensor 86, i.e., on a lower side of the conveyance path 52. The lower line sensor 88 reads an image formed on a lower surface of the document conveyed along the conveyance path 52.

The first sheet sensor 24 is opposed to the first conveying roller 72 at the most upstream portion of the conveyance path 52. The first sheet sensor 24 detects whether the document is set on the sheet-supply tray 50. The second sheet sensor 26 is provided between the driven roller 80 and the upper line sensor 86 on the conveyance path 52. The second sheet sensor 26 detects the document conveyed through a position opposed to the second sheet sensor 26.

Scan Processing by Scanner 10

In this scanner 10, a plurality of documents are placed on the sheet-supply tray 50, conveyed one by one by the ADF 22, and read by the image sensor 20 to execute the scan processing for the plurality of documents. However, the sheet-supply tray 50 can support only up to a predetermined number of documents, e.g., fifty documents. Thus, in the case where the scan processing is executed for documents of greater than the predetermined number, a continuous scanning is executed. In the continuous scanning, for example, in the case where the scan processing is executed for 100 documents, the scan processing is first executed for the first to 50th documents, and after the completion of the scan processing, the scan processing is executed for the 51st to 100th documents. Scan data obtained by scanning of the first to 50th documents and scan data obtained by scanning the 51st to 100th documents are combined with each other as one group of data. As a result, the user obtains scan data based on 100 documents as one group of data.

Figure 3:
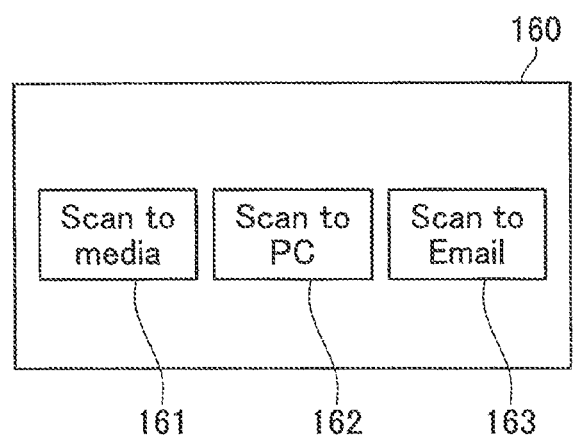
FIG. 3 is a view illustrating a scan-processing selection screen.

There will be next explained execution of the continuous scanning by the scanner 10. The scanner 10 first controls the display 16 to display a scan-processing selection screen 160 illustrated in FIG. 3 which is one example of a sixth screen. The scan-processing selection screen 160 contains a scan-to-media button 161, a scan-to-PC button 162, and a scan-to-Email button 163. The scan-to-media button 161, when operated, causes the CPU 12 to store scan data into a USB memory connected to the USB host interface 27. The scan-to-PC button 162, when operated, causes the CPU 12 to transmit scan data to the PC 40. The scan-to-Email button 163, when operated, causes the CPU 12 to transmit scan data over the Internet 37 by email. That is, the scan-processing selection screen 160 is a screen for the user to select a destination of output of the scan data.

Figure 4:
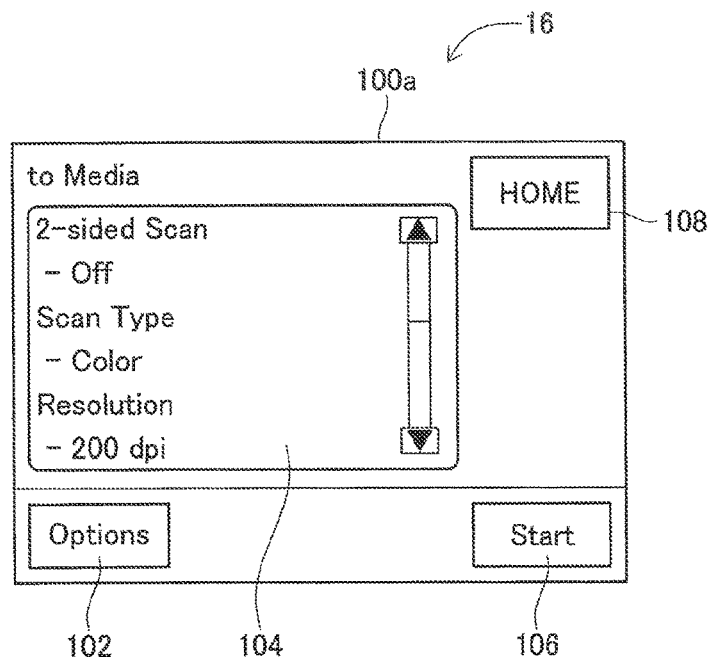
FIG. 4 is a view illustrating a scanning instruction screen.

When the scan-to-media button 161 displayed on the scan-processing selection screen 160 is operated, the CPU 12 controls the display 16 to display a scanning instruction screen 100*a* illustrated in FIG. 4 which is one example of a third screen. In the case where one of the scan-to-PC button 162 and the scan-to-Email button 163 is operated, the CPU 12 controls the display 16 to display a corresponding one of a first scanning instruction screen and a second scanning instruction screen. This operation is similar to the operation for the scanning instruction screen 100*a*, and an explanation and illustration thereof are dispensed with. In the following description, where the distinction of these screens is not required, each screen will be simply referred to as "scanning instruction screen 100". The scanning instruction screen 100 contains a change button 102, a setting-value display area 104, a Start button 106, and a HOME button 108. The change button 102 is for changing setting values used in scanning. The setting-value display area 104 is an area for displaying current setting values. When the setting value is changed in response to an operation on the change button 102, the changed setting value is displayed on the setting-value display area 104. The Start button 106, when operated, causes the CPU 12 to start the scan processing. That is, the document placed on the sheet-supply tray 50 is conveyed by the ADF 22, and the image sensor 20 starts reading the document. The HOME button 108 is for returning back to the scan-processing selection screen 160.

Figure 5:
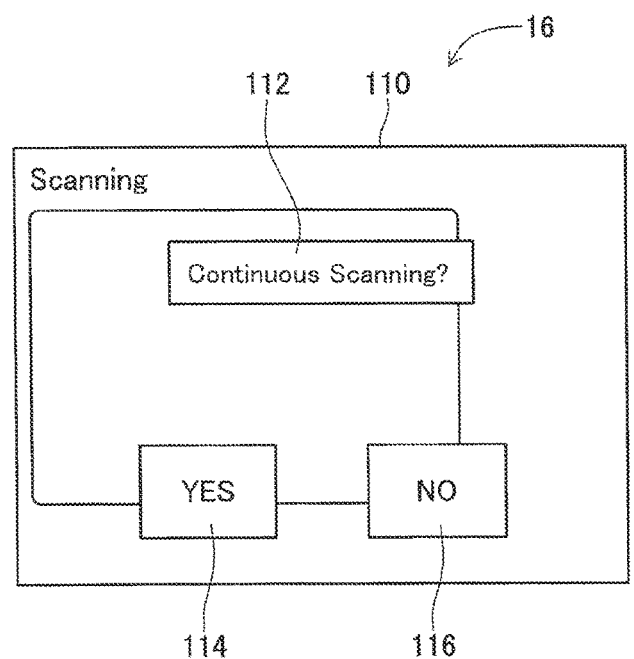
FIG. 5 is a view illustrating a scanning screen.

When the scan processing is started, the CPU 12 controls the display 16 to display a scanning screen 110 illustrated in FIG. 5 which is one example of a first screen. The scanning screen 110 is displayed during scanning of the documents supplied from the sheet-supply tray 50. The scanning screen 110 contains a comment area 112, a YES button 114, and a NO button 116. A comment for inquiring about whether the continuous scanning is to be executed is displayed on the comment area 112. The YES button 114, when operated, causes the CPU 12 to execute the continuous scanning. The NO button 116, when operated, causes the CPU 12 not to execute the continuous scanning but to execute only the scan processing for the documents placed on the sheet-supply tray 50. That is, the user operates the YES button 114 in the case where the user wants to obtain the scan data created based on the documents placed on the sheet-supply tray 50 and scan data created based on other documents, as one group of data, and the user operates the NO button 116 in the case where the user wants to obtain only the scan data created based on the documents placed on the sheet-supply tray 50, as one group of data. In this scanner 10 as described above, the screen for input of whether the continuous scanning is to be executed is displayed on the display 16 not before a start of the scan processing but during execution of the scan processing. As a result, the user can cause the scanner 10 to execute the scan processing quickly and can input an instruction about whether the continuous scanning is to be executed, during a waiting time for the scan processing.

Figure 6:
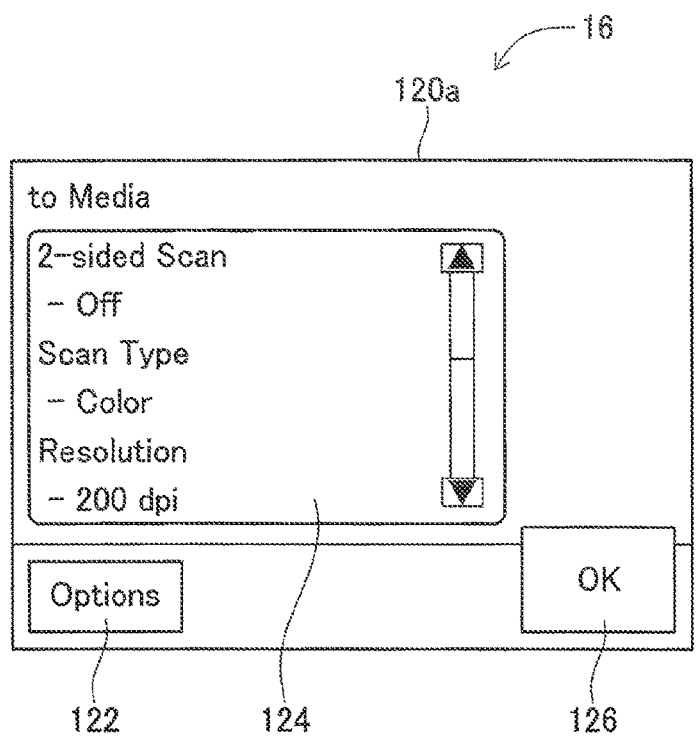
FIG. 6 is a view illustrating a setting screen.

When the scan-to-media button 161 is selected on the scan-processing selection screen 160, and then the YES button 114 is operated on the scanning screen 110, the CPU 12 controls the display 16 to display a setting screen 120*a* illustrated in FIG. 6 which is one example of a fifth screen. When the scan-to-PC button 162 or the scan-to-Email button 163 is selected on the scan-processing selection screen 160, the CPU 12 controls the display 16 to display a corresponding one of a first setting screen and a second setting screen. This operation is similar to the operation for the setting screen 120*a*, and an explanation and illustration thereof are dispensed with. In the following description, where the distinction of these screens is not required, each screen will be simply referred to as "setting screen 120". The setting screen 120 is for the user to change setting values of the continuous scanning. The setting screen 120 contains a change button 122, a setting-value display area 124, and an OK button 126. The change button 122 and the setting-value display area 124 are respectively identical to the change button 102 and the setting-value display area 104 displayed on the scanning instruction screen 100. It is noted that, in the case where no setting value is changed by operation on the change button 122, setting values of the scan processing being executed are displayed on the setting-value display area 124, that is, setting values of the scan processing for the documents placed on the sheet-supply tray 50 are displayed on the setting-value display area 124. Accordingly, in the case where the OK button 126 is operated without operation on the change button 122 on the setting screen 120, the continuous scan processing is executed based on the setting values of the scan processing being executed, i.e., the setting values of the scan processing for the documents placed on the sheet-supply tray 50. In the case where the change button 122 is operated on the setting screen 120 to change the setting values, and then the OK button 126 is operated on the setting screen 120, the continuous scan processing is executed based on the changed setting values.

When the OK button 126 is operated on the setting screen 120, the CPU 12 determines whether the scan processing for all the documents placed on the sheet-supply tray 50 is completed. This determination is executed based on values of detection of the first sheet sensor 24 and the second sheet sensor 26. Specifically, the first sheet sensor 24 detects whether the document is placed on the sheet-supply tray 50, and when the first sheet sensor 24 has not detected any documents placed on the sheet-supply tray 50, it is detected whether the document is discharged from the conveyance path 52 onto the output tray 60. When the document being conveyed by the conveyance path 52 is detected by the second sheet sensor 26, the scanned document is discharged onto the output tray 60 after a particular length of time passes from the detection. Thus, the CPU 12 determines, based on the value of detection of the second sheet sensor 26, whether the document is discharged from the conveyance path 52 onto the output tray 60. The CPU 12 then determines that the scan processing for all the documents placed on the sheet-supply tray 50 is completed, at the timing when the last document is discharged from the conveyance path 52 onto the output tray 60.

Figure 7:
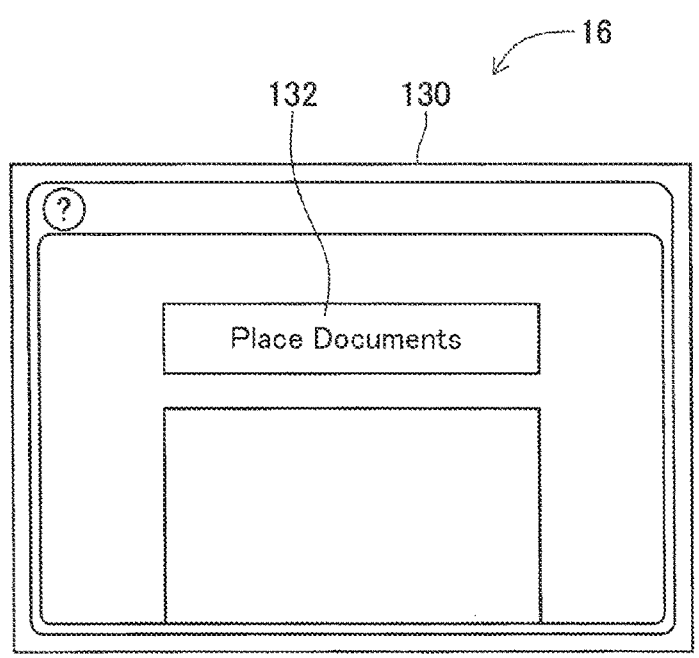
FIG. 7 is a view illustrating a document-placement prompting screen.

When the CPU 12 determines, in response to operation on the OK button 126, that the scan processing for all the documents placed on the sheet-supply tray 50 is completed, the CPU 12 controls the display 16 to display a document-placement prompting screen 130 illustrated in FIG. 7. The document-placement prompting screen 130 contains a comment area 132. A comment prompting the user to place documents onto the sheet-supply tray 50 is displayed on the comment area 132. The user having viewed this comment places new documents onto the sheet-supply tray 50 as documents for which the continuous scanning is to be executed.

Figure 8:
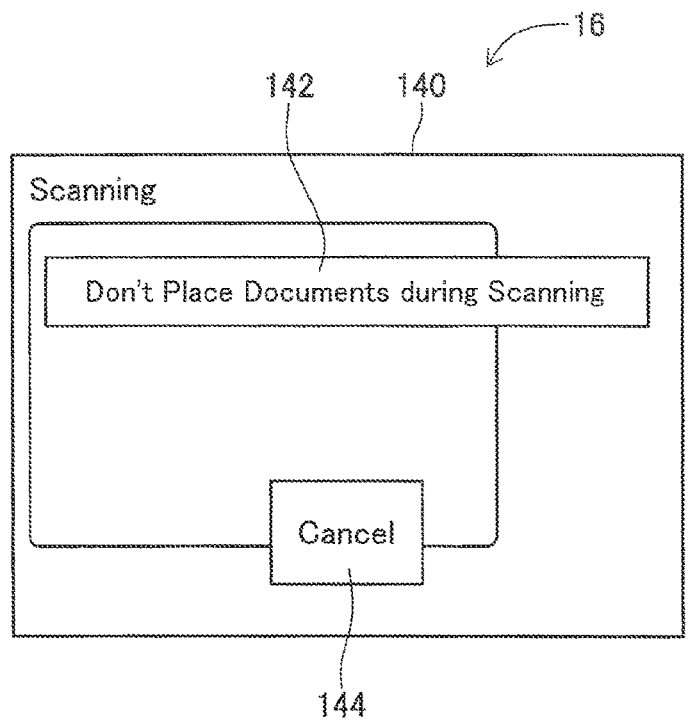
FIG. 8 is a view illustrating a caution screen.

However, when new documents are additionally placed on the sheet-supply tray 50 during the scan processing in which the document is conveyed by the ADF 22 or read by the image sensor 20, the document cannot be conveyed appropriately in some cases, leading to a jam of the document being conveyed or inappropriate reading of the document. To solve this problem, when the CPU 12 determines, upon operation on the OK button 126 displayed on the setting screen 120, that the scan processing for all the documents placed on the sheet-supply tray 50 has not been completed, the CPU 12 controls the display 16 to display a caution screen 140 illustrated in FIG. 8 which is one example of a fourth screen. The caution screen 140 contains a comment area 142 and a Cancel button 144. On the comment area 142 is displayed a comment indicating prohibition of placement of new documents on the sheet-supply tray 50 during scanning. This operation prevents new documents from being placed on the sheet-supply tray 50 during scanning, making it possible to reliably execute the appropriate scan processing.

The Cancel button 144 is a button for canceling the continuous scanning. When the Cancel button 144 is operated, the continuous scanning is canceled, and the scanning screen 110 is displayed on the display 16. Since the caution screen 140 is a screen displayed during execution of the scan processing, the document-placement prompting screen 130 illustrated in FIG. 7 is displayed on the display 16 when the scan processing is completed, that is, when the CPU 12 determines that the scan processing for all the documents placed on the sheet-supply tray 50 is completed, based on the values of detection of the first sheet sensor 24 and the second sheet sensor 26. It is noted that the point in time when the scan processing for all the documents placed on the sheet-supply tray 50 is completed is one example of a first timing.

Figure 9:
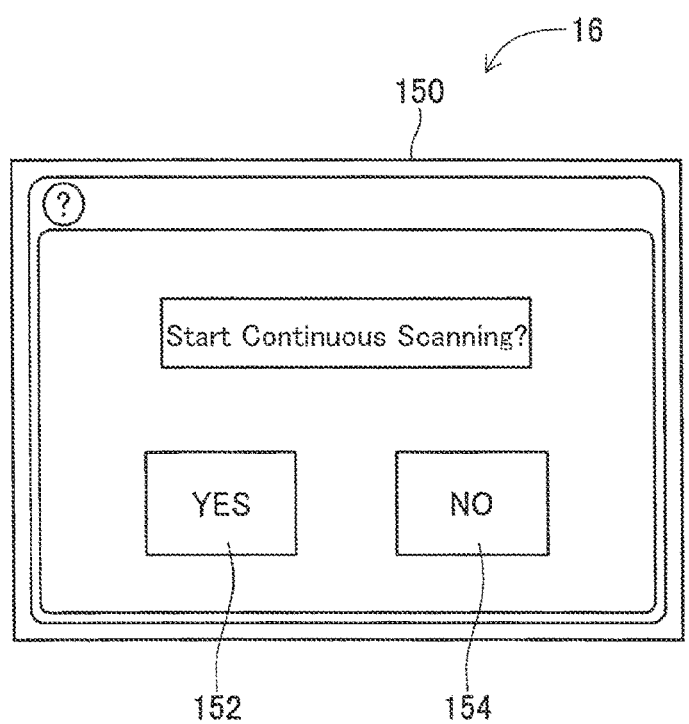
FIG. 9 is a view illustrating a continuous scanning instruction screen.

When new documents are thereafter placed on the sheet-supply tray 50 by the user having viewed the comment displayed on the document-placement prompting screen 130, the CPU 12 controls the display 16 to display a continuous scanning instruction screen 150 illustrated in FIG. 9 which is one example of a second screen. It is noted that the presence or absence of the documents placed on the sheet-supply tray 50 is determined based on the value of detection of the first sheet sensor 24. The continuous scanning instruction screen 150 contains a YES button 152 and a NO button 154. The YES button 152, when operated, causes the CPU 12 to start the continuous scan processing as one example of a continuous reading processing. That is, one of the documents newly placed on the sheet-supply tray 50 is conveyed by the ADF 22 and starts to be read by the image sensor 20. The NO button 154, when operated, causes the CPU 12 to cancel the continuous scanning and display the scanning instruction screen 100 on the display 16.

It is noted that when the continuous scan processing is started, the CPU 12 controls the display 16 to display the scanning screen 110 illustrated in FIG. 5. That is, the user is allowed to instruct the CPU 12 to further execute the continuous scan processing after the scanning for the documents newly placed on the sheet-supply tray 50, and when the user wants to cause the CPU 12 to additionally executes the continuous scan processing, the user operates the YES button 114 displayed on the scanning screen 110. In this case, as described above, the setting screen 120 and other screens are displayed on the display 16, and the above-described processings are executed continuously.

In the case where the user wants to cause the CPU 12 to execute only the scan processing for the documents placed on the sheet-supply tray 50 first (noted that this scan processing is one example of a first reading processing) or in the case where, during the continuous scan processing, the user does not want to cause the CPU 12 to additionally execute the continuous scan processing after the scan processing for the documents newly placed on the sheet-supply tray 50, the user operates the NO button 116 displayed on the scanning screen 110. Immediately after the operation of the NO button 116 displayed on the scanning screen 110, the CPU 12 controls the display 16 to display the scanning instruction screen 100 illustrated in FIG. 4. With these processings, new scan data can be created in a state in which the new scan data is separated from the scan processing for the documents placed on the sheet-supply tray 50 first or the scan data created in the continuous scan processing. In the above-described explanation, in any of the case where the NO button 116 is operated on the scanning screen 110 and the case where the NO button 154 is operated on the continuous scanning instruction screen 150, the display 16 displays the scanning instruction screen 100a corresponding to the scan-to-media processing. However, in the case where a reading processing most recently started is the scan-to-PC processing or the scan-to-email processing, the display 16 displays one of the scanning instruction screen 100b and the scanning instruction screen 100c which corresponds to the reading processing most recently started. Also, the Start button 106 displayed on the scanning instruction screen 100 is grayed out and does not accept a user operation until completion of the scan processing being executed.

The display 16 displays the scanning instruction screen 100 illustrated in FIG. 4 also in the case where the scan processing for all the documents placed on the sheet-supply tray 50 is completed in a state in which neither the YES button 114 nor the NO button 116 is operated on the scanning screen 110. As a result, even when the NO button 116 is not operated by the user having no intention of causing the continuous scanning, for example, the scanning instruction screen 100 is displayed on the display 16. That is, the display screen can be returned to the original screen for scanning without any operation on the scanning screen 110.

However, in the case where a small number of documents are placed on the sheet-supply tray 50, or in the case where the scan processing is to be executed at a high speed due to a low resolution set by the user, for example, the scan processing for all the documents placed on the sheet-supply tray 50 may be completed for a short time. In such a case, the scanning screen 110 is displayed on the display 16 for a short time, whereby the user cannot perform a desired operation on the scanning screen 110 in some case. In this scanner 10, to solve this problem, even in the case where the scan processing for all the documents placed on the sheet-supply tray 50 is completed in the state in which neither the YES button 114 nor the NO button 116 is operated on the scanning screen 110, when a length of time within which the scanning screen 110 is displayed (hereinafter may be referred to as "display time of the scanning screen 110" is less than a set length of time, the scanning instruction screen 100 is not displayed on the display 16 instead of the scanning screen 110. That is, when the scan processing for all the documents placed on the sheet-supply tray 50 is completed in the state in which neither the YES button 114 nor the NO button 116 is operated on the scanning screen 110, the scanning instruction screen 100 is displayed on the display 16 instead of the scanning screen 110 on condition that the display time of the scanning screen 110 has exceeded the set length of time.

Specifically, a measurement of the display time of the scanning screen 110 is started at the timing when the scanning screen 110 is displayed on the display 16. When the scan processing for all the documents placed on the sheet-supply tray 50 is completed in the state in which neither the YES button 114 nor the NO button 116 is operated on the scanning screen 110, the CPU 12 determines whether the display time of the scanning screen 110 has exceeded the set length of time. When the display time of the scanning screen 110 has exceeded the set length of time, the scanning instruction screen 100 is displayed on the display 16 instead of the scanning screen 110. When the display time of the scanning screen 110 has not exceeded the set length of time, the scanning screen 110 is displayed on the display 16 until the display time of the scanning screen 110 exceeds the set length of time, and when the display time of the scanning screen 110 has exceeded the set length of time, the scanning instruction screen 100 is displayed on the display 16. These operations allow the user to operate the scanning screen 110 with sufficient time.

Control Program

The scan processing is executed by execution of the control program 33 by the CPU 12 of the scanner 10. There will be next explained, with reference to FIGS. 10-12, a flow of processings executed when the control program 33 is executed by the CPU 12 of the scanner 10. This flow begins when a power button, not shown, is operated to turn on the scanner 10, and this flow ends when the power button is operated to turn off the scanner 10.

Figure 10:
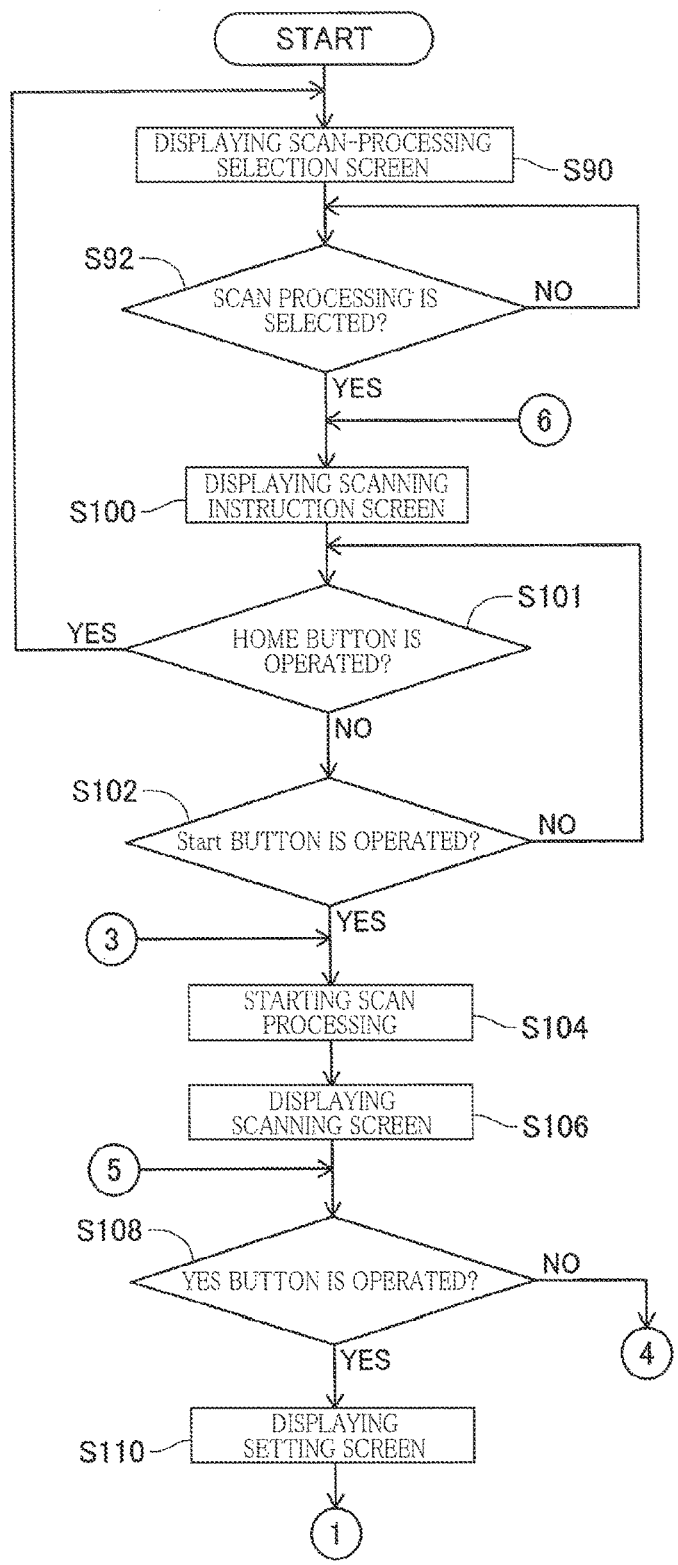
FIG. 10 is a flow chart illustrating processings in the scanner according to a first embodiment.

When the control program 33 is executed, as illustrated in FIG. 10, the scan-processing selection screen 160 is displayed at S90. The CPU 12 at S92 determines whether any of the scan-to-media button 161, the scan-to-PC button 162, and the scan-to-Email button 163 is operated on the scan-processing selection screen 160. When any of the buttons is operated (S92: YES), this flow goes to S100. When any of the buttons is not operated (S92: NO), the CPU 12 repeats the processing at S92. The CPU 12 at S100 controls the display 16 to display the scanning instruction screen 100 corresponding to the scan processing that corresponds to the button operated on the scan-processing selection screen 160. The CPU 12 at S101 determines whether the HOME button 108 is operated on the scanning instruction screen 100. When the HOME button 108 is operated (S101: YES), this flow returns to S90. When the HOME button 108 is not operated (S101: NO), this flow goes to S102. The CPU 12 at S102 determines whether the Start button 106 is operated. When the Start button 106 is not operated (S102: NO), this flow returns to S101. When the Start button 106 is operated (S102: YES), the CPU 12 at S104 starts the scan processing.

The CPU 12 at S106 displays the scanning screen 110 on the display 16. It is noted that when the scanning screen 110 is displayed on the display 16, the CPU 12 starts the measurement of the display time of the scanning screen 110. The CPU 12 at S108 determines whether the YES button 114 is operated on the scanning screen 110. When the YES button 114 is operated (S108: YES), the CPU 12 at S110 displays the setting screen 120 on the display 16. The CPU 12 at S112 determines whether the CPU 12 receives a signal indicating a change of the setting value. That is, the CPU 12 determines whether the setting value is changed in response to an operation of the change button 122 on the setting screen 120.

When the setting value is changed on the setting screen 120 (S112: YES), the CPU 12 at S114 changes the setting value to the received setting value, i.e., the changed setting value, and this flow goes to S116. When the setting value is not changed on the setting screen 120 (S112: NO), this flow goes to S116 by skipping S114.

The CPU 12 at S116 determines whether the OK button 126 is operated on the setting screen 120. When the OK button 126 is not operated (S116: NO), this flow returns to S112. When the OK button 126 is operated (S116: YES), the CPU 12 at S118 determines whether the scan processing is completed. When the scan processing is not completed (S118: NO), the CPU 12 at S120 displays the caution screen 140 on the display 16.

The CPU 12 at S122 determines whether the scan processing is completed. When the scan processing is not completed (S122: NO), the CPU 12 repeats the processing at S122. When the scan processing is completed (S122: YES), this flow goes to S124. When the CPU 12 at S118 determines that the scan processing is completed (S118: YES), this flow goes to S124 by skipping S120 and S122.

The CPU 12 at S124 displays the document-placement prompting screen 130 on the display 16. The CPU 12 at S126 determines whether the documents are placed on the sheet-supply tray 50. When the documents are not placed on the sheet-supply tray 50 (S126: NO), the CPU 12 repeats the processing at S126. When the documents are placed on the sheet-supply tray 50 (S126: YES), the CPU 12 at S128 displays the continuous scanning instruction screen 150 on the display 16.

The CPU at S130 determines whether the YES button 152 is operated on the continuous scanning instruction screen 150 and determines whether the NO button 154 is operated on the continuous scanning instruction screen 150. When the YES button 152 is operated (S130: YES), this flow returns to S104. When the NO button 154 is operated (S130: NO), the CPU 12 at S132, outputs scan data to a destination corresponding to the scan processing selected at S92, and this flow returns to S100.

When the CPU 12 at S108 determines that the YES button 114 is not operated on the scanning screen 110 (S108: NO), the CPU 12 at S134 determines whether the NO button 116 is operated on the scanning screen 110. When the NO button 116 is operated (S134: YES), this flow goes to S132. As described above, when the NO button 116 is operated on the scanning screen 110, the CPU 12 displays the scanning instruction screen 100 illustrated in FIG. 4 without waiting for the completion of the preceding scan processing. That is, when the positive decision (YES) is made at S134, and processings at S132 and subsequent steps are to be executed, the CPU 12 executes the processing at S100 without waiting for the completion of the processing at S132. When the NO button 116 is not operated (S134: NO), the CPU 12 at S136 determines whether the scan processing is completed.

When the scan processing is completed (S136: YES), the CPU 12 at S138 determines whether the display time of the scanning screen 110 has exceeded the set length of time. When the display time of the scanning screen 110 has exceeded the set length of time (S138: YES), this flow goes to S132. When the display time of the scanning screen 110 has not exceeded the set length of time (S138: NO), this flow returns to S108. When the scan processing is not completed (S136: NO), this flow returns to S108 by skipping S138. It is noted that the scan data output at S132 upon completion of the scan processing is as follows: When the YES button 114 is operated at S108, and the YES button 152 is operated at S130 after new documents are placed on the sheet-supply tray 50, scan data created based on the documents placed on the sheet-supply tray 50 first and scan data created based on the documents newly placed are combined and output as one group of scan data. When the YES button 114 is not operated at S108, and the NO button 116 is operated at S134, the scan data created based on the documents placed on the sheet-supply tray 50 first are output. Likewise, when the NO button 116 is not operated at S134, and the display time (elapsed time) exceeds the set length of time at S138, the scan data created based on the documents placed on the sheet-supply tray 50 first is output.

It is noted that each of the processings at S108 and S134 is one example of a first determination processing. The processing at S138 is one example of a second determination processing.

Second Embodiment

In the first embodiment, immediately after the NO button 116 is operated on the scanning screen 110, the scanning instruction screen 100 is displayed on the display 16. In a scanner 10 according to a second embodiment, the scanning instruction screen 100 is not displayed on the display 16 immediately after the NO button 116 is operated but displayed after the scan processing is completed.

Specifically, in the scanner 10 according to the second embodiment, when the NO button 116 is operated on the scanning screen 110, the CPU 12 determines whether the scan processing for all the documents placed on the sheet-supply tray 50 is completed. When the scan processing for all the documents placed on the sheet-supply tray 50 is not completed, the CPU 12 continues displaying the scanning screen 110 on the display 16. After the scan processing for all the documents placed on the sheet-supply tray 50 is completed, the scanning instruction screen 100 is displayed on the display 16 instead of the scanning screen 110. That is, when the NO button 116 is operated, the scanning screen 110 is displayed until the scan processing is completed. The screen displayed in this processing allows the user to recognize that the scan processing is being executed.

It is noted that when the NO button 116 is operated, and the CPU 12 determines that the scan processing is not completed, and the scanning screen 110 is displayed on the display 16, and the YES button 114 is operated on this scanning screen 110, the CPU 12 cancels the operation of the NO button 116 and executes the processing in response to the operation of the YES button 114. This processing eliminates a mistake of pressing the wrong button.

In this second embodiment, the scan processing is executed by execution of the control program 33 by the CPU 12. There will be next explained, with reference to FIG. 13, a flow of processings executed when the control program 33 is executed by the CPU 12 of the scanner 10 according to the second embodiment. Many processings in this flow are similar to those in the first embodiment, and these processings will be explained simply. Also, the processings at S100-S124 in the first embodiment are identical to processings in the flow in the second embodiment, and an explanation and illustration of which are dispensed with.

Figure 11:
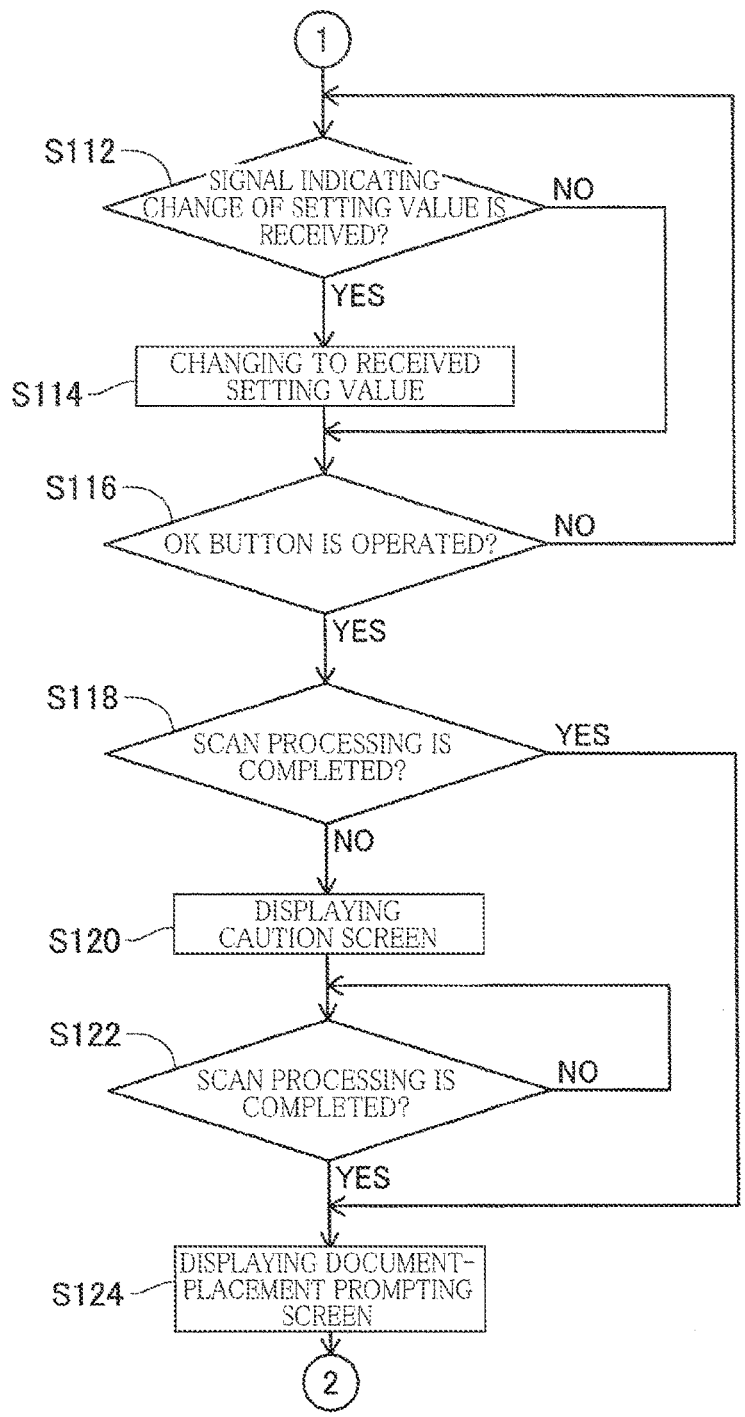
FIG. 11 is a flow chart illustrating processings in the scanner according to the first embodiment.
Figure 12:
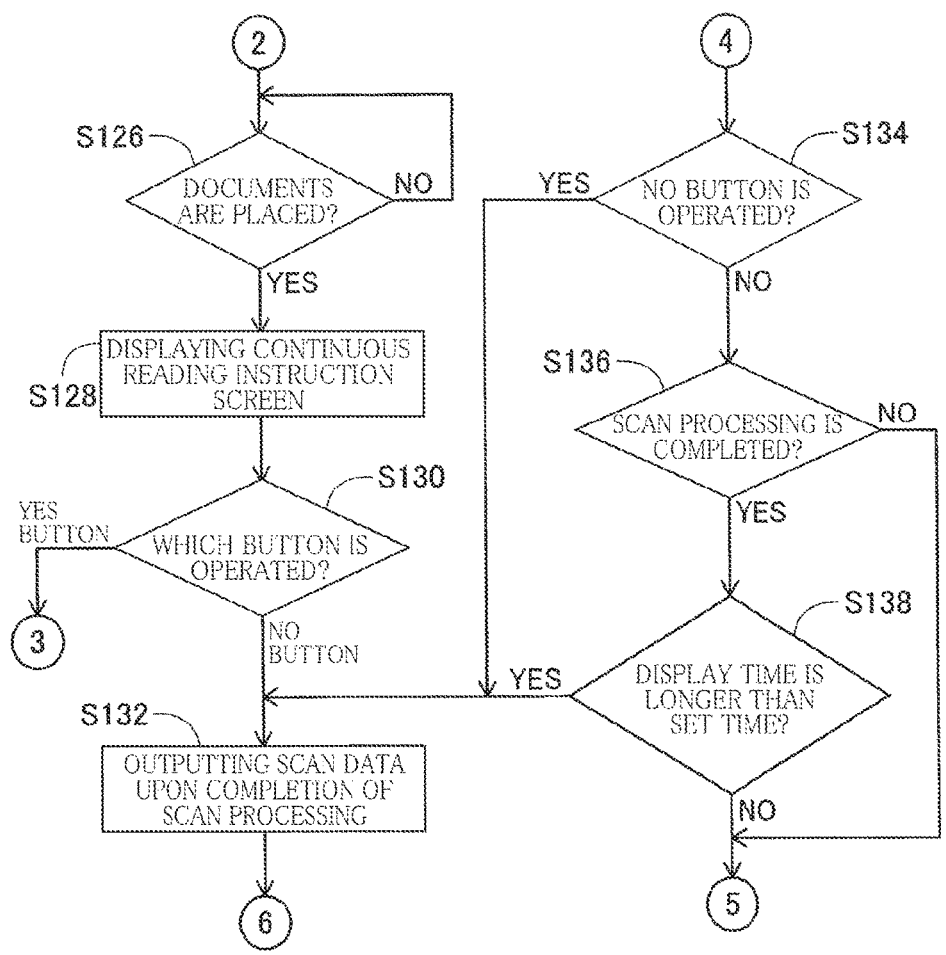
FIG. 12 is a flow chart illustrating processings in the scanner according to the first embodiment.
Figure 13:
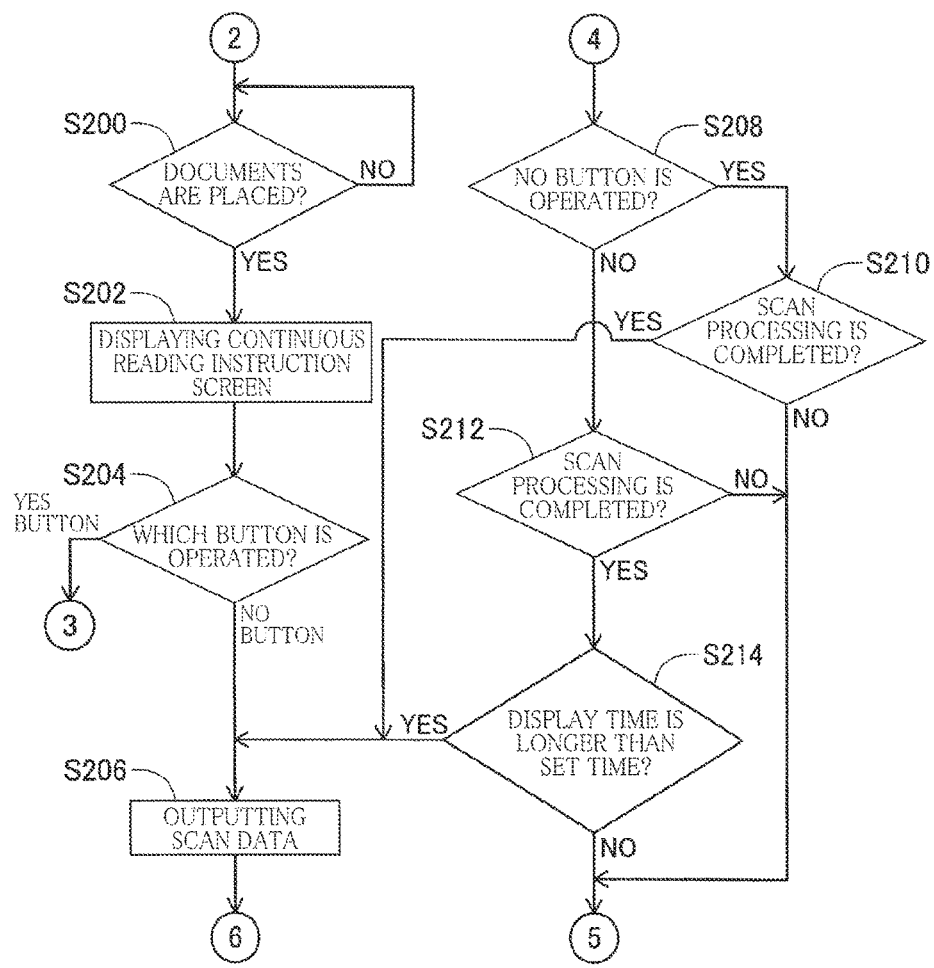
FIG. 13 is a flow chart illustrating processings in the scanner according to a second embodiment.

When the control program 33 is executed in the scanner 10 according to the second embodiment, the CPU 12 executes the processings at S90-S124 in FIGS. 10 and 11. Upon completion of the processing at S124, as illustrated in FIG. 13, the CPU 12 executes processings at S200-S206, but the processings at S200-S206 are identical to those at S126-132 in FIG. 12, and an explanation of which is dispensed with.

When the CPU 12 at S108 in FIG. 10 determines that the YES button 114 is not operated on the scanning screen 110 (S108: NO), as illustrated in FIG. 13, the CPU 12 at S208 determines whether the NO button 116 is operated on the scanning screen 110. When the NO button 116 is operated (S208: YES), the CPU 12 at S210 determines whether the scan processing is completed. When the scan processing is completed (S210: YES), this flow goes to S206. When the scan processing is not completed (S210: NO), this flow returns to S108 in FIG. 10.

When the CPU 12 at S208 determines that the NO button 116 is operated (S208: NO), the CPU 12 executes processings at S212 and S214. These processings are identical to the processings at S136 and S138 in FIG. 12, and an explanation of which is dispensed with.

While the embodiments have been described above, it is to be understood that the disclosure is not limited to the details of the illustrated embodiments, but may be embodied with various changes and modifications, which may occur to those skilled in the art, without departing from the spirit and scope of the disclosure. For example, in the above-described embodiments, the second sheet sensor 26 disposed in the conveyance path 52 is used for determination of whether the document is discharged onto the output tray 60. However, a sheet sensor may be provided on the output tray 60, and the CPU 12 may use a value of detection of the sheet sensor to determine whether the document is discharged onto the output tray 60.

After the scan data is output at S132 in the first embodiment and at S206 in the second embodiment, the CPU 12 returns to S90 to display the scan-processing selection screen 160 (as one example of the sixth screen) instead of returning to S100 to display the scanning instruction screen 100.

In the above-described embodiments, when the NO button 116 is operated on the scanning screen 110, the scanning instruction screen 100 is displayed on the display 16. Instead of this processing, when the NO button 116 is operated on the scanning screen 110, the scan-processing selection screen 160 may be displayed.

While the processings illustrated in FIGS. 10-13 are executed by the CPU 12 in the above-described embodiments, other devices may execute these processing. For example, these processing may be executed by an ASIC or other logical integrated circuits and may be executed by cooperation of the CPU, the ASIC, and other the logical integrated circuits, for example.

What is claimed is:

1. An image reading apparatus, comprising:
   a document supporter configured to support a plurality of documents;
   an output-document receiving member;
   a conveying mechanism configured to convey the plurality of documents one by one from the document supporter along a conveyance path;
   a reading device provided on the conveyance path and configured to execute a reading processing in which the reading device reads the plurality of documents conveyed by the conveying mechanism;
   an output device configured to output reading data created based on the plurality of documents read by the reading device;
   a display;
   a user interface configured to receive a signal based on a user operation; and
   a controller configured to perform:
      starting displaying of a first screen on the display in a period starting from a first timing when reading of the plurality of documents, which are presently placed on the document supporter, by the reading device is started and ending at a second timing when the reading of the plurality of documents is completed, the first screen being configured to inquire about whether a continuous reading processing is to be executed after a completion of the reading of the plurality of documents presently placed on the document supporter, the plurality of documents being continuously read by the reading device from the first timing to the second timing;
      determining, in a first determination processing, whether a signal indicating execution of the continuous reading processing is received by the user interface in a state in which the first screen is displayed;
      displaying a second screen when the controller determines in the first determination processing that the signal indicating execution of the continuous reading processing is received by the user interface, the second screen being configured to accept an instruction of execution of the continuous reading processing that is to be executed after the completion of the reading of the plurality of documents, the second screen being displayed after the completion of the reading of the plurality of documents; and
      combining reading data created in the readings the plurality of documents and reading data created in the continuous reading processing with each other as a group of reading data and controlling the output device to output the group of reading data when the controller determines that the instruction of execution of the continuous reading processing is accepted on the second screen.

2. The image reading apparatus according to claim 1, wherein the controller is configured to display a third screen on the display when the controller determines in the first determination processing that the signal indicating execution of the continuous reading processing is not received by the user interface,
   wherein the third screen is different from the second screen and configured to inquire about whether an additional reading processing is to be started after the completion of the reading of the plurality of documents, and
   wherein the controller is configured to control the output device in the additional reading processing to output reading data independently of the reading data created in the reading of the plurality of documents.

3. The image reading apparatus according to claim 2, wherein the controller is configured to control the output device to output the reading data created in the reading of the plurality of documents as a group of data when the controller determines in the first determination processing that the signal indicating execution of the continuous reading processing is not received by the user interface.

4. The image reading apparatus according to claim 2, wherein the controller is configured to determine, in the first determination processing, that the signal indicating execution of the continuous reading processing is not received by the user interface when a signal indicating inexecution of the continuous reading processing is received by the user interface in the state in which the first screen is displayed or when neither the signal indicating execution of the continuous reading processing nor the signal indicating inexecution of the continuous reading processing is received by the user interface in the state in which the first screen is displayed.

5. The image reading apparatus according to claim 2, wherein the controller is configured to:
   determine, in a second determination processing, whether a first period is elapsed from a time point at which the first screen is displayed on the display; and
   determine in the first determination processing that the signal indicating execution of the continuous reading processing is not received by the user interface, when the reading of the plurality of documents is completed in a state in which neither a signal indicating inexecution of the continuous reading processing nor the signal indicating execution of the continuous reading processing is received by the user interface and when the controller determines in the second determination processing that the first period is elapsed from the time point at which the first screen is displayed on the display.

6. The image reading apparatus according to claim 2, wherein the controller is configured to display the third screen on the display when the controller determines in the first determination processing that the signal indicating execution of the continuous reading processing is not received by the user interface and when the reading of the plurality of documents is completed.

7. The image reading apparatus according to claim 2, wherein the controller is configured to display the third screen on the display before the reading of the plurality of documents is completed, when the controller determines, in the reading of the plurality of documents, in the first determination processing that the signal indicating execution of the continuous reading processing is not received by the user interface.

8. The image reading apparatus according to claim 1,
   wherein the controller is configured to display a fourth screen on the display before displaying the second screen on the display, when the controller determines in the first determination processing that the signal indicating execution of the continuous reading processing is received by the user interface before the reading of the plurality of documents is completed, and
   wherein the fourth screen is configured to provide caution indicating that at least one document to be read after the completion of the reading of the plurality of documents is not to be placed on the document supporter.

9. The image reading apparatus according to claim 1, wherein the controller is configured to control the user interface to receive a signal designating a setting value of the continuous reading processing, when the controller determines in the first determination processing that the signal indicating execution of the continuous reading processing is received by the user interface.

10. The image reading apparatus according to claim 9,
    wherein the controller is configured to display a fifth screen on the display when the controller determines in the first determination processing that the signal indicating execution of the continuous reading processing is received by the user interface, and
    wherein the fifth screen comprises a setting value set in the reading of the plurality of documents.

11. The image reading apparatus according to claim 1,
    wherein the controller is configured to display a sixth screen on the display after the completion of the reading of the plurality of documents when the controller determines in the first determination processing that the signal indicating execution of the continuous reading processing is not received by the user interface, and
    wherein the sixth screen is configured to promote selection of a mode of output of a reading processing to be executed after the completion of the reading of the plurality of documents.

12. The image reading apparatus according to claim 2, wherein a mode of output of the additional reading processing is identical to a mode of output of the reading of the plurality of documents, and no selection of the mode of output of the additional reading processing is performed between the reading of the plurality of documents and the additional reading processing.

13. A non-transitory storage medium storing a plurality of instructions to be executed by a processor of an image reading apparatus, the image reading apparatus comprising:
    a document supporter configured to support a plurality of documents;
    an output-document receiving member;
    a conveying mechanism configured to convey the plurality of documents one by one from the document supporter along a conveyance path;
    a reading device provided on the conveyance path and configured to execute a reading processing in which the reading device reads the plurality of documents conveyed by the conveying mechanism;
    an output device configured to output reading data created based on the plurality of documents read by the reading device;
    a display; and
    a user interface configured to receive a signal based on a user operation,
    the plurality of instructions, when executed by the processor, causing the image reading apparatus to perform:
        starting displaying of a first screen on the display in a period starting from a first timing when reading of the plurality of documents which are presently placed on the document supporter, by the reading device is started and ending a second timing when the reading of the plurality of documents are completed, the first screen being configured to inquire about whether a continuous reading processing is to be executed after a completion of the reading of the plurality of documents presently placed on the document supporter, the plurality of documents being continuously read by the reading device from the first timing to the second timing;
        determining, in a first determination processing, whether a signal indicating execution of the continuous reading processing is received by the user interface in a state in which the first screen is displayed;
        displaying a second screen when the controller determines in the first determination processing that the signal indicating execution of the continuous reading processing is received by the user interface, the second screen being configured to accept an instruction of execution of the continuous reading processing that is to be executed after the completion of the reading of the plurality of documents, the second screen being displayed after the completion of the reading of the plurality of documents; and
        combining reading data created in the reading of the plurality of documents and reading data created in the continuous reading processing with each other as a group of reading data and controlling the output device to output the group of reading data when the controller determines that the instruction of execution of the continuous reading processing is accepted on the second screen.

14. An image reading apparatus, comprising:
a document supporter configured to support at least one document;
an output-document receiving member;
a conveying mechanism configured to convey the at least one document one by one from the document supporter along a conveyance path;
a reading device provided on the conveyance path and configured to execute a reading processing in which the reading device reads the at least one document conveyed by the conveying mechanism;
an output device configured to output reading data created based on the at least one document read by the reading device;
a display;
a user interface configured to receive a signal based on a user operation; and
a controller configured to perform:
displaying a first screen on the display during at least a portion of a first reading processing, a period of the first reading processing extending from a time point at which the conveying mechanism starts conveying a first one of the at least one document placed on the document supporter, to a time point at which the conveying mechanism finishes conveying a last one of the at least one document placed on the document supporter, the first screen being configured to inquire about whether a continuous reading processing is to be executed after a completion of the first reading processing;
determining, in a first determination processing, whether a signal indicating execution of the continuous reading processing is received by the user interface in a state in which the first screen is displayed;
displaying a second screen when the controller determines in the first determination processing that the signal indicating execution of the continuous reading processing is received by the user interface, the second screen being configured to accept an instruction of execution of the continuous reading processing that is to be executed after the completion of the first reading processing; and
combining reading data created in the first reading processing and reading data created in the continuous reading processing with each other as a group of reading data and controlling the output device to output the group of reading data when the controller determines that the instruction of execution of the continuous reading processing is accepted on the second screen,
wherein the controller is configured to display a third screen on the display when the controller determines in the first determination processing that the signal indicating execution of the continuous reading processing is not received by the user interface,
wherein the third screen is different from the second screen and configured to inquire about whether the additional reading processing is to be started after the first reading processing,
wherein the controller is configured to control the output device in the additional reading processing to output reading data independently of the reading data created in the first reading processing, and
wherein the controller is configured to display the third screen on the display before the first reading processing is completed, when the controller determines, during the first reading processing, in the first determination processing that the signal indicating execution of the continuous reading processing is not received by the user interface.

15. An image reading apparatus, comprising:
a document supporter configured to support at least one document;
an output-document receiving member;
a conveying mechanism configured to convey the at least one document one by one from the document supporter along a conveyance path;
a reading device provided on the conveyance path and configured to execute a reading processing in which the reading device reads the at least one document conveyed by the conveying mechanism;
an output device configured to output reading data created based on the at least one document read by the reading device;
a display;
a user interface configured to receive a signal based on a user operation; and
a controller configured to perform:
displaying a first screen on the display during at least a portion of a first reading processing, a period of the first reading processing extending from a time point at which the conveying mechanism starts conveying a first one of the at least one document placed on the document supporter, to a time point at which the conveying mechanism finishes conveying a last one of the at least one document placed on the document supporter, the first screen being configured to inquire about whether a continuous reading processing is to be executed after a completion of the first reading processing;
determining, in a first determination processing, whether a signal indicating execution of the continuous reading processing is received by the user interface in a state in which the first screen is displayed;
displaying a second screen when the controller determines in the first determination processing that the signal indicating execution of the continuous reading processing is received by the user interface, the second screen being configured to accept an instruction of execution of the continuous reading processing that is to be executed after the completion of the first reading processing; and
combining reading data created in the first reading processing and reading data created in the continuous reading processing with each other as a group of reading data and controlling the output device to output the group of reading data when the controller determines that the instruction of execution of the continuous reading processing is accepted on the second screen,
wherein the controller is configured to display a fourth screen on the display before displaying the second screen on the display, when the controller determines in the first determination processing that the signal indicating execution of the continuous reading processing is received by the user interface before the first reading processing is completed, and
wherein the fourth screen is configured to provide caution indicating that at least one document to be read after the completion of the first reading processing is not to be placed on the document supporter.

\* \* \* \* \*